Aug. 26, 1958 G. JENDRASSIK 2,848,871
IMPROVEMENTS IN LOW PRESSURE SCAVENGING
ARRANGEMENTS OF PRESSURE EXCHANGERS
Filed Sept. 14, 1953 5 Sheets-Sheet 1

INVENTOR
George Jendrassik
BY Stevens, Davis, Miller & Mosher
his ATTORNEYS

Aug. 26, 1958

G. JENDRASSIK 2,848,871

IMPROVEMENTS IN LOW PRESSURE SCAVENGING
ARRANGEMENTS OF PRESSURE EXCHANGERS

Filed Sept. 14, 1953

INVENTOR
George Jendrassik
BY
Stevens, Davis, Miller & Mosher
his ATTORNEYS

Aug. 26, 1958  G. JENDRASSIK  2,848,871
IMPROVEMENTS IN LOW PRESSURE SCAVENGING
ARRANGEMENTS OF PRESSURE EXCHANGERS
Filed Sept. 14, 1953  5 Sheets-Sheet 3

INVENTOR
George Jendrassik
BY
his ATTORNEYS

Aug. 26, 1958         G. JENDRASSIK         2,848,871
IMPROVEMENTS IN LOW PRESSURE SCAVENGING
ARRANGEMENTS OF PRESSURE EXCHANGERS
Filed Sept. 14, 1953                                         5 Sheets-Sheet 4

INVENTOR
George Jendrassik

BY
ATTORNEYS

Aug. 26, 1958     G. JENDRASSIK     2,848,871
IMPROVEMENTS IN LOW PRESSURE SCAVENGING
ARRANGEMENTS OF PRESSURE EXCHANGERS
Filed Sept. 14, 1953     5 Sheets-Sheet 5

INVENTOR
George Jendrassik
BY
ATTORNEYS

United States Patent Office 2,848,871
Patented Aug. 26, 1958

2,848,871

LOW PRESSURE SCAVENGING ARRANGEMENTS OF PRESSURE EXCHANGERS

George Jendrassik, London, England; Andre G. T. Boszormenyi and Clara Jendrassik, executors of said George Jendrassik, deceased, assignors, by mesne assignments, to Jendrassik Developments Limited, London, England Application September 14, 1953, Serial No. 380,076

Claims priority, application Great Britain September 26, 1952

7 Claims. (Cl. 60—39.45)

This invention relates to rotary pressure exchangers of the kind comprising a ring of cells for the compression and expansion of gas, ducting to lead gas to and from the cells at heat input and heat rejection stages, and means for effecting relative rotation between the ring of cells and ducting.

At the heat rejection stage the expanded hot gas contained within a cell is replaced by cooler fresh gas obtained for instance by scavenging the cell. The removal of the hot gas and its replacement by cooler gas requires expenditure of work which could more profitably be employed to improve the efficiency of the pressure exchanger.

It is an object of the present invention to provide pressure exchangers in which at the heat rejection stage expanded hot gas removed from any cell is itself utilised to assist in its replacement by cool gas. This may be achieved through the intermediary of a cooling arrangement incorporated in the ducting at the heat rejection stage. By this means the energy input for the apparatus required at the heat rejection stage may be substantially reduced from that hitherto required. It is also possible to create in cells leaving the heat rejection stage a pressure different from the intake or the ambient pressure, which difference may be advantageous in certain circumstances.

According to one feature of the present invention there is provided a pressure exchanger of the kind described in which said ducting at the heat rejection stage comprises branches upstream and downstream of the cell ring and in which means are provided to scavenge the gas content of each cell at the heat rejection stage characterised by an interconnecting duct between said branches forming therewith a substantially closed duct system and by cooling means for gas flowing in said system.

By substantially closed duct system is meant one that has, in operation, no gas introduced from an outside source, e. g. the atmosphere, in such quantities as would materially affect the operation of the pressure exchanger.

The invention, in another aspect, also provides a pressure exchanger of the kind described in which said ducting at the heat rejection stage comprises branches upstream and downstream of the cell ring and in which means are provided to scavenge the gas content of each cell at the heat rejection stage characterised by an interconnecting duct between said branches, a pipe into said interconnecting duct through which gas from outside of the pressure exchanger is introduced and cooling means for gas flowing in said duct system.

It is convenient in practical machines for the cells to be incorporated in a rotor which is rotatable relative to the gas ducting and the following description will, for convenience, be mainly in terms of such machines. It is to be understood however that this does not exclude the possibility of using a stationary cell structure and a rotary ducting structure. Moreover having regard to the operating speed of the machine and the relative size of the cells and ducting the momentary communication of a cell simultaneously with the heat rejection ducting and any other duct is not to be considered as an effective communication in the working conditions so long as such communication is so brief or so timed that no compression or depression impulse can pass from one duct to the other. It will be apparent that when the machine is static there may well be clearly simultaneous connection between any one cell and other ducting in addition to the heat rejection ducting.

By the application of external heating and external cooling for the heat rejection, the pressure exchanger can supply any gas in a compressed state compared with the pressure at which it is introduced, thus acting as a compressor without requiring external mechanical work.

The invention is applicable to pressure exchangers employing transfer channels by means of which the expansion of gas from some cells directly causes the compression of gas in others. Alternatively there are other pressure exchangers in which compression and depression impulses set up within the cells cause the compression and expansion to take place. These modes of operation may be combined and the invention is applicable to any such pressure exchangers.

Embodiments of the invention described below will illustrate different ways in which the heat rejection ducting upstream and downstream of the cell may be arranged.

The invention will now be described by way of example only with reference to certain embodiments thereof shown in the accompanying drawings in which.

Figure 1:
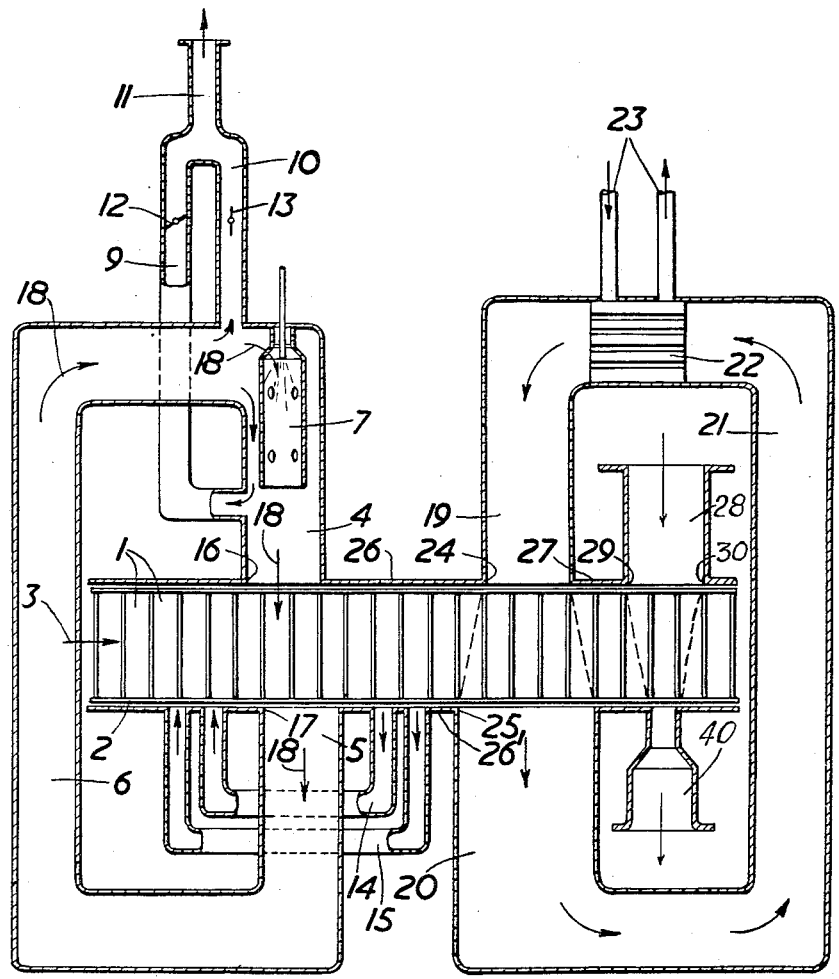
Figure 1 is a schematic peripheral development of a pressure exchanger having a rotatable cell wheel and stationary end plates of the kind in which transfer channels are employed to effect the simultaneous compression and expansion of gas within the cells.

In Figure 1 there will be seen cells 1 in the rotatable cell wheel 2, the whole being drawn out as a peripheral development. The cell wheel 2 rotates carrying each cell past the ducting in the direction of the arrow 3. The pressure exchanger is arranged in the diagram so that for any cell the ducting in the upper half thereof may generally be considered as upstream of that particular cell. The heat input arrangement is shown to the left of the diagram and the heat extraction zone is on the right. The ducts are arranged to be closely adjacent the faces of the cell wheel and they are separated from one another by portions of the end plates which are in close sealing engagement with the cell wheel.

The heat input into any cell is effected by hot gases passing from the upstream end 4 of the heat input ducting into a cell. On the other side of the cell wheel there is the downstream end 5 of the heat input ducting and the upstream and downstream ends of this ducting are joined by an interconnection 6. Heat input is provided by the burning of fuel in the combustion chamber 7. Ducts by means of which hot pressurised gas may be extracted from the heat input system are shown at 9 and 10. These ducts join into a common duct 11 via which this gas may be taken away for external use. Throttles 12 and 13 in the ducts 9 and 10 control the supply of this externally used gas.

Transfer channels 14 and 15 connect the cells containing hot high pressure gas to those containing cooler gas not yet pressurised. Two transfer channels only are shown but it will be understood that there may be considerably more than this number. The positions of the leading and trailing edges of the heat input ducts shown at 16 and 17 are of some importance. Where the edge 16 is reached before the edge 17 by any cell relative to its motion the gas flow into the cell at the heat input stage is in the direction of the arrow 18. In this embodiment any cell reaching the heat input zone is first opened on the upstream side of the heat input ducting and also first closed on the same side.

The heat rejection zone of the pressure exchanger is shown on the right hand side of the diagram and it will be seen that the upstream and downstream ends of the ducting, 19 and 20 respectively, concerned with heat rejection are linked together by an interconnecting duct 21. In this closed ducting system 19, 20, 21 there is arranged a cooling means 22 which may be any convenient type of heat exchanger. Gases in the system give up heat to the cooler 22, the heat being carried away by fluid flowing through the cooler as indicated by the arrows 23. The leading edges 24 and 25 of the upstream and downstream ends respectively of the heat rejection duct are arranged so that the circulation of gas is obtained in the closed circuit 19, 20, 21. A cell reaching the heat rejection zone is first opened on its downstream side by passing the edge 25. Only afterwards is it opened on its upstream side by passing the edge 24. The closure of any cell is indicated as being effected in the reverse order that is first on the upstream side and only later on the downstream side. Sealing sectors 26 and 26' separate the heat input and heat rejection zones.

Another end plate sealing sector 27 separates the heat rejection ducting from the further ducting on the upstream side at 28. This ducting is an inlet ducting and serves the purpose of introducing cool gas (which may be atmospheric air) into the cells. The controlling edges 29 and 30 are so arranged that a compression impulse started in the cell by passing the edge 29 has time to travel to the opposite end of the cell before the cell is opened to a scavenging duct 40. In a similar manner the staggering of the control edges 24 and 25 is preferably arranged so that a depression impulse started within the cell by edge 25 should reach the opposite end of the cell, so that there the pressure has dropped by the time that cell reaches the edge 24.

This opening or closing of a cell by the edge of a duct is not a very accurately defined event in the working conditions. For practical purposes a cell might be accepted as open to a duct if at least a quarter to one half of its end area has been freed by the duct edge, and closed if less than a quarter to one third of its end area is left free. Whether the opening or closing is "effective" depends upon the design features and speed of individual machines.

The operation of this pressure exchanger is as follows:

The general principle of operation of the pressure exchanger will be taken to be known, the short description below being taken as sufficient. Consider a cell moving in the direction of the arrow 3 as it arrives opposite the transfer channel 15. It is initially filled with cool gas of low pressure. As it continues past the transfer channels such as 15 and 14 its pressure is raised by successive communication with these transfer channels and ultimately it passes the edge 16 of the heat input duct and the cell interior is placed into communication with that duct. The relatively cool and compressed gas contained within the cell is further compressed and displaced and scavenged by the heated gas made available from the heat input system. As has been previously explained other hot gas made available from this system is able to be removed via the ducts 9, 10 and 11 to perform useful work elsewhere. The cells pass through the heat input zone and leave that region containing hot compressed gas. Thereafter they come into communication with the transfer channels 14 and 15 and their internal pressure gradually decreases. Continuing in the same direction a cell will ultimately reach the controlling edge 25 of the heat rejection ducting. The pressure there prevailing is lower than that in a cell arriving at that zone so that a depression impulse is set up in the cell which reaches its other end when that passes the edge 24. Gas flows from the cell into the ducting 20 in the direction of the arrow in the figure. As the cell continues to pass the duct 19 flow through the cell continues with decreasing velocity during the entire scavenging period and the cell leaves this zone containing cooled and low pressure gas. The scavenging flow that takes place through the cell also sets up resultant gas flow via the ducting 21 and through the cooler 22. This accounts for the lowering of the temperature of the gas in the cell. The pressure of the gas in the cell before and after leaving the heat rejection zone is different since the mass of gas in the cell is substantially the same in both instances. A cell therefore arrives opposite the duct 28 with its internal pressure much lower than previously in the cycle. The duct 28 communicates with a source of gas at a higher pressure (e. g. the atmosphere) than then prevailing in the cell so that gas rushes into the cell, the cell becoming pressure charged and possibly even supercharged in relation to the pressure to which the duct 28 is connected.

Figure 2:
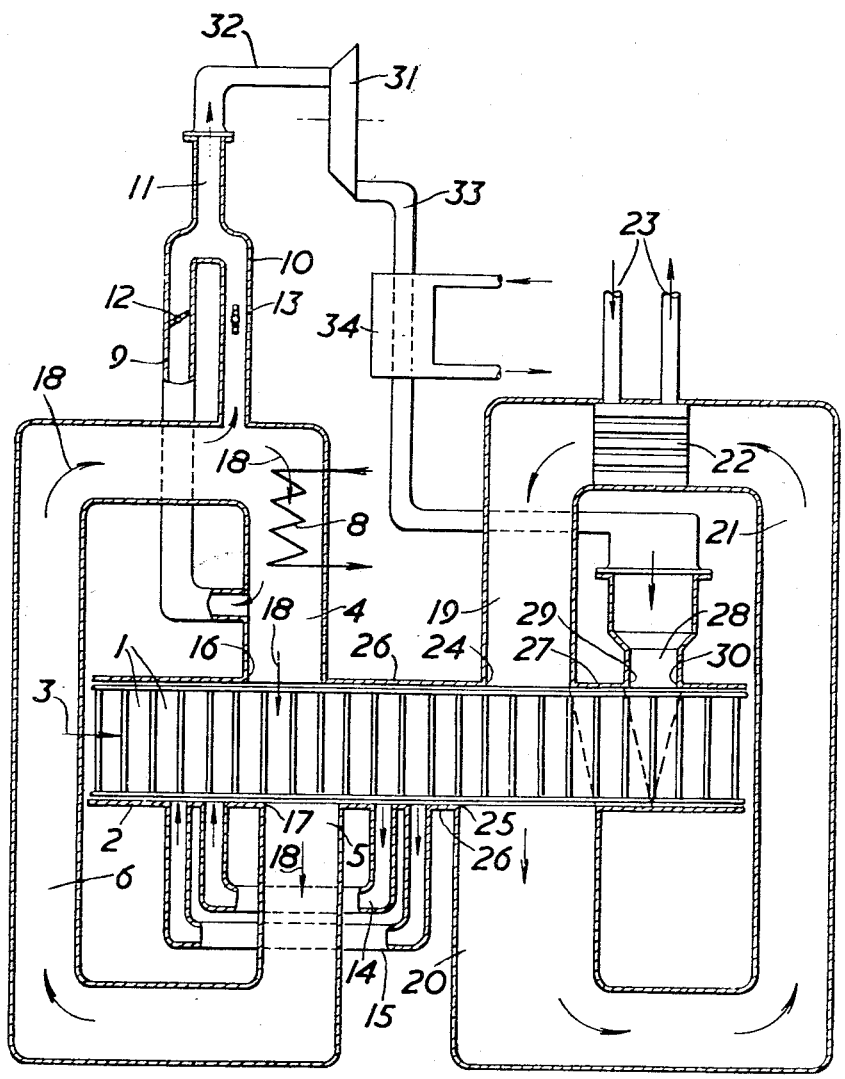
Figure 2 shows a modification of the pressure exchanger shown in Figure 1.

Shown in Figure 2 there is an alternative arrangement which provides a completely closed cycle apparatus. Hot gases passing from the heat input zone through the duct 11 are taken via a duct 32 to a machine 31 in which those gases are expanded. This machine may of course be a turbine and is shown as such. The exhaust from the turbine is taken via the duct 33 through a cooling arrangement 34 to the duct 28. As we have a completely closed circuit heat input is by indirect heating and the heater 8 replaces the combustion chamber 7. If heat introduction is effected by the heater 8 then this device may serve as a "thermo-compressor," supplying the gas introduced at 28 in a compressed state via duct 11 and at least partly heating the gases in duct 18.

There may be further ducting on the downstream side of the cells so that the cells are open to this other source of cool gas at both ends each of which can here be considered as "upstream" of the cells. With this latter arrangement the time during which the cells need to be opened can be reduced.

Figure 3:
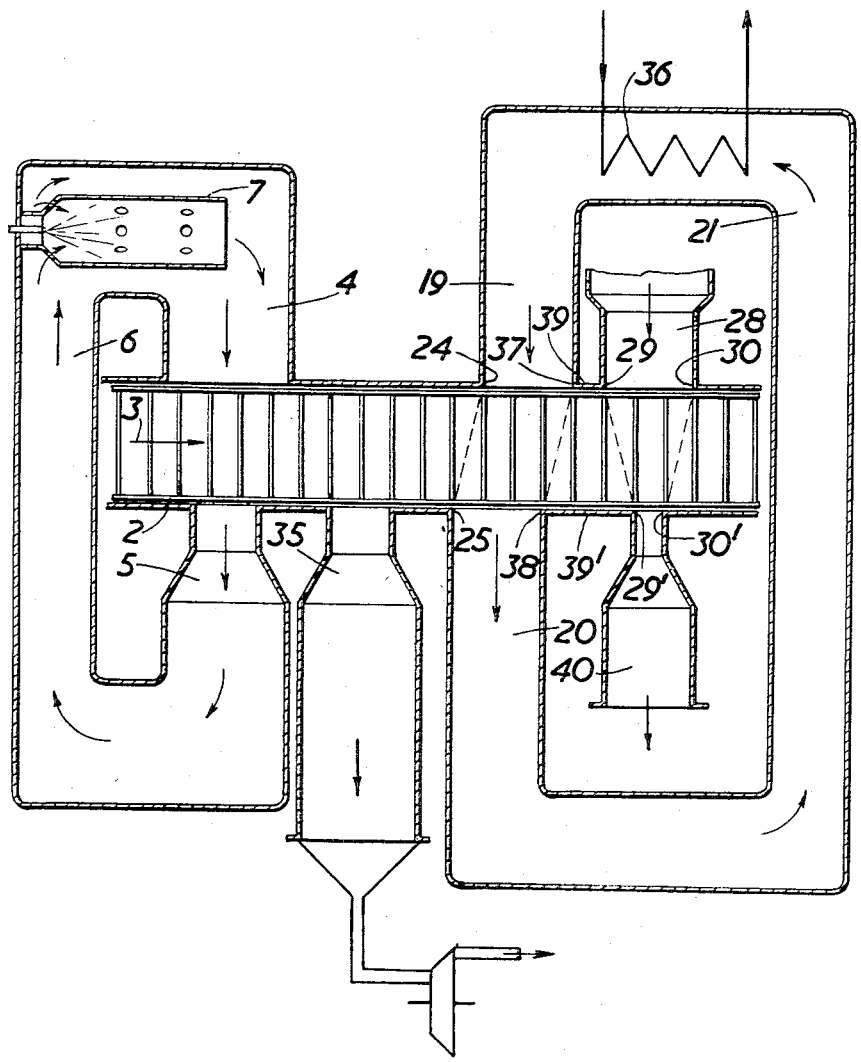
Figure 3 is a view of another embodiment of the invention namely a pressure exchanger in which gas compression and expansion are effected without recourse to the provision of transfer channels.

In Figure 3 there is again shown a cell wheel 2 which is rotated in the direction of the arrow 3 past stationary ducting and end plates. The heat input ducts are shown at 4, 5 and 6 and they form a substantially closed circuit. A pressure exchanger having such a closed circuit heat input zone is described and claimed in patent application Serial No. 294,757. The heat input is provided by the combustion chamber 7. No transfer channels are provided in this example of a pressure exchanger, the main pressure rise feature being due to heating at practically constant volume, which heating produces pressure impulses within the cells. Hot gas for external use is withdrawn via the passage 35 and in the figure it is indicated as being used in an expansion turbine. The process of heat input and gas extraction in this manner is already known and will not be detailed further.

The ducting in the heat rejection zone comprises an upstream branch 19, a downstream branch 20 and an interconnection 21 joining these two branches. This closed system incorporates a cooler 36.

The leading edges of the ducts in this embodiment of the invention are arranged exactly as they are in the Figure 1 embodiment. The trailing edges 37 and 38 are staggered in this example so that the downstream branch closes a cell before the upstream branch. The staggering of the edges 37 and 38 corresponds approximately to the interval at the normal speed of rotation of the cell wheel which is required for a compression impulse starting from the edge 38 to travel through a cell to its other end.

There is separated from the duct 19 by a sector 39 of the sealing end plate, an input duct 28 e. g. for air. On the other side of the cell wheel from this duct there is a scavenging duct 40. This is separated from the heat rejection zone duct 20 by the sector 39' of the end plate of this side of the machine. The staggering of the leading edges 29 and 29' and the trailing edges 30 and 30' of the ducts 28 and 40 is so arranged that the downstream end of a cell is opened by the edge 29' when the compression impulse started within the cell by the opening of its upstream end by the edge 29 reaches the end adjacent the edge 29'; similarly the compression impulse started by the edge 30' reaches the upstream end of the cell when it passes the edge 30.

In operation a cell coming from the high pressure heat input zone leaves the gas extraction duct 35 filled with expanded hot gas. The pressure of this gas is above the pressure prevailing in the duct 20. As a cell passes the edge 25 a depression impulse starts to travel along the cell and a gas flow starts within the cell so that gas moves out into the duct 20. This flow continues after the edge 27 of the duct 19 has been passed and the hot gas in the cell is therefore replaced by cooled gas provided from the cooler 36. The compression impulse due to the edge 38 within the cell prevents further gas movement and the pressure in the cell is somewhat raised. Even so after this scavenging process has been passed through the pressure in the cell is lower than it was before it reached the heat rejection zone. The speed of rotation of the cell wheel and the dimensions of the cells are such that the resultant effect of the depression and compression impulses at edges 25 and 38 respectively causes the gas pressure in a cell on reaching duct 28 to be lower than the pressure in duct 28 e. g. atmospheric pressure. Thus when the cell passes the edge 29 gas (e. g. air) rushes into the cell. For a short period the cell is open at both ends and further scavenging takes place until the pressure impulse in the cell due to the edge 30' stops further gas movement. The cell may then even be supercharged over the pressure in duct 28.

Figure 4:
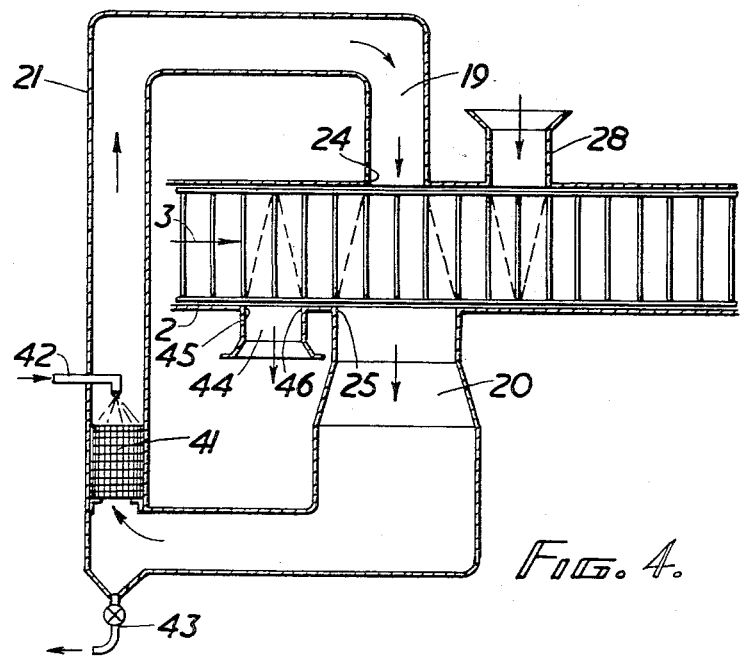
Figure 4 shows the heat rejection zone of a pressure exchanger. In this embodiment the closed gas system at the heat rejection stage has a matrix cooling arrangement.

Only the heat rejection zone of a pressure exchanger is shown in Figure 4. Again we have the upstream and downstream branches 19 and 20 of the heat rejection closed cycle system. But in this instance the interconnection 21 is shown to contain a matrix type of cooler allowing gas and a liquid coolant to flow in counterflow therethrough. The coolant is introduced via the tube 42 and withdrawn via the drain 43. Any suitable type of matrix may be employed, for example a plate metal sheet matrix, a pebble arrangement, or some suitable porous mass. The matrix may even be omitted and the coolant simply sprinkled into the gas to be cooled. The arrangement shown is similar to that in Figure 1 in that it has a cool gas duct 28. It is different in that there is a gas extraction duct 44 the leading and trailing edges of which 45 and 46 are spaced so that at the normal speed or rotation a depression impulse is able to travel from the downstream end of a cell to its other end and back again before the cell is closed by the trailing edge.

In this arrangement the cell arriving at the duct 44 passes the edge 45 and a depression impulse passing forwards and backwards throughout the length of the cell causes the hot expanded gas to flow out into the duct 44. Depending on the pressure levels in the machine this gas might be taken to the same space as the duct 28 for example to the atmosphere or it may be connected to some expanding machine in which extraneous work is produced. A cell continuing beyond the edge 46 has a considerably lower pressure due to the gas having flown out of it so that there is less gas to be cooled in the heat rejection stage in this instance. The pressure being lower than in previous embodiments a higher degree of supercharging can be achieved. In this arrangement also it is possible to form a closed cycle by connecting the duct 44 or the exhaust duct of the expanding machine with the duct 28 through a cooler as necessary. It will be appreciated that the Figure 3 embodiment can also be conveniently formed into a closed cycle.

Figure 5 again shows only the heat rejection zone of a pressure exchanger. The arrangement is generally similar to that shown in Figure 3 but another pipe 47 is shown by means of which extra gas can be introduced into the ducting system at the heat rejection zone. The gas introduced via this pipe may be the expanded gas from an expansion machine or from some other user of pressurised gas taken from the pressure exchanger. Such a combination is shown in Figure 6. The hot gas supply for the device external to the pressure exchanger is in this instance extracted directly from the cell wheel via the duct 35 rather than from the heat input ducting as shown at 11 in Figure 1. The device using the hot gas is again shown as a turbine 31, the hot gas being fed thereto through the duct 32. Exhausted gas from the turbine passes via the duct 33 and the cooler 34 to the pipe 47 leading into the heat rejection ducting. Other gas is taken from an intermediate pressure level of the turbine through the flow connection 49 to the inlet 28 with which cells communicate after they have effectively passed the heat rejection ducting. The latter incorporates the cooling arrangement 36, both this and the cooler being provided with coolant supply from the pipes 50 through valves 51. From the same supply and valves a cooler 52 for the gas flow in the connection 49 is fed. It will be appreciated that the combination is itself a closed-cycle system so that indirect heating at the heat input stage is used. The arrangement permits a lower pressure to be maintained in the heat rejection duct than is possible with the combination described with reference to Figure 1, i. e. the expansion ratio for the gas used externally of the pressure exchanger may be greater.

Figure 5:
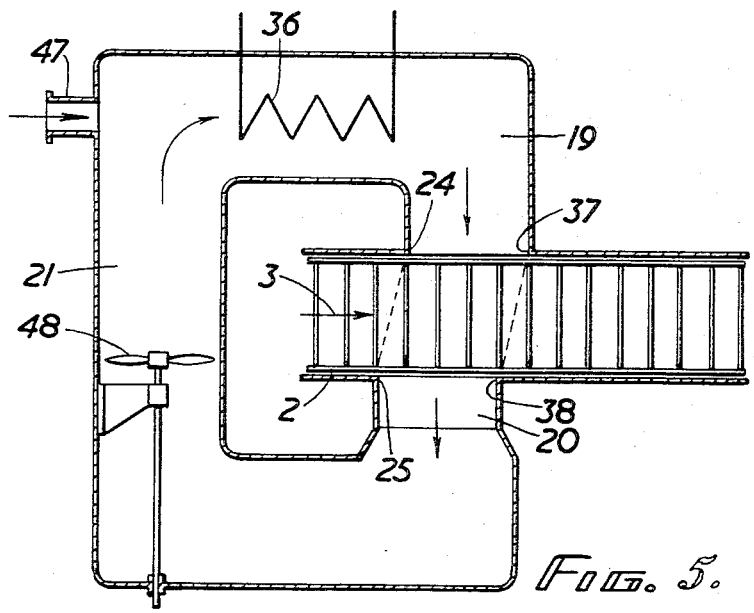
Figure 5 shows an embodiment generally similar to that of Figure 4 but incorporating a different ducting arrangement at the heat rejection stage.
Figure 6:
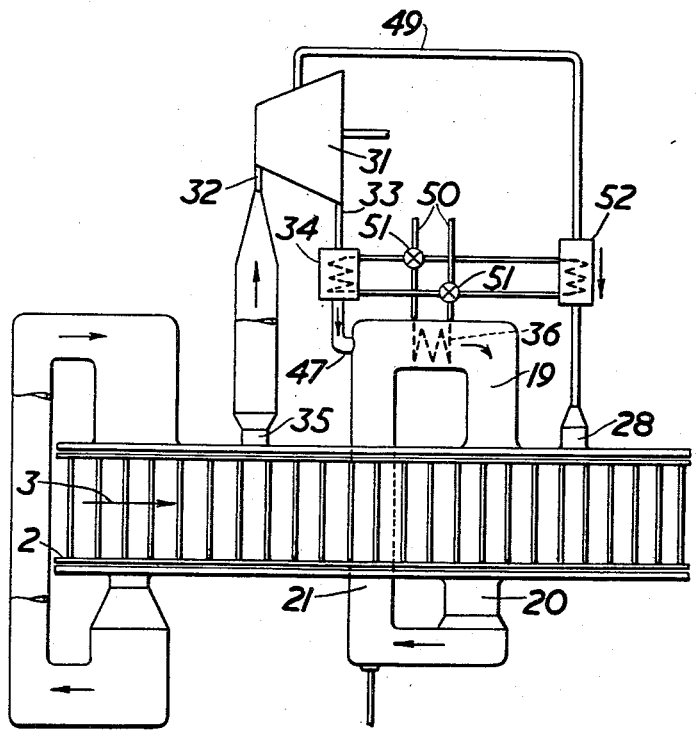
Figure 6 shows a combination of pressure exchanger similar to that of Figure 5 with apparatus external thereto and making use of hot gas from the pressure exchanger, the whole combination forming a closed cycle.

In the operation of an arrangement such as is shown in Figure 5 or Figure 6 a cell reaching the edge 25 of a duct branch 20 contains expanded hot gas at a pressure higher than that prevailing in the branch so that gas flow out into the downstream branch 20 is effected. The pressure of gas in a cell reaching the edge 25 is determined by the preceding compression or depression impulses; that is to say, by the speed of rotation of the cell wheel and the cell dimensions. This scavenging process persists and the hot gas in the cell is displaced by cool gas from the upstream branch 19, the compression impulse at the closing of the cell causing the gas to be supercharged. Owing to the introduction of gas via the pipe 47 a greater mass of gas is left in the cell leaving the heat rejection zone compared with the mass entering that zone. Hence the cell gas pressure drop in the heat rejection stage is not so great as when there is no noticeable entry of gas at this stage. Cells upon communicating with the inlet 28 for cool gas are thereafter brought up at least to the gas pressure in that inlet and as the flow then is from a higher to a lower pressure a supercharging effect is obtained, as previously described.

It is also possible in the Figure 5 arrangement to introduce through the pipe 47 entirely fresh gas, which may be atmospheric air. If the arrangement is such that in duct 21 a lower pressure than atmospheric prevails, the fresh gas may be expanded in some other apparatus before entering the pipe 47. Of course, the introduction of fresh gas requires the expulsion of other gas in the cycle e. g. compressed gas at the heat input stage.

In this and the other embodiments of the invention a fan 48 can be incorporated in the heat rejection circuit if it is desired. It is convenient for starting up and also for helping in maintaining the scavenging in the heat rejection zone.

The means for effecting relative rotation between cell ring and ducting can be chosen for suitability in any particular embodiment of the invention. For instance with a rotary cell wheel, an electric motor may be employed or the cell walls may be shaped so that the gas flow therein itself causes rotation. These are only two of many possible alternatives.

Pressure exchangers are known wherein two cell rings work in cooperative tandem arrangement. Gas transfer channels connect cells in the two cell rings which are contra-rotated. The invention is applicable to such pressure exchangers also and in particular it is to be understood that the heat rejection stage gas flow path can incorporate cells of both rotors and still be considered as one ducting system.

Similarly a common cooling arrangement can be provided for the heat rejection stages of several pressure exchangers. Because the several duct systems have such communication it does not debar then from being considered as embodiments of the present invention.

Small quantities of gas for secondary purposes can be introduced into or extracted from the heat rejection stage ducting without departing from the spirit of the invention. Gas so extracted may for example drive auxiliaries or cause the relative rotation of the pressure exchanger itself or be used for cooling purposes. Fresh working fluid or gas compensation for leakage may for example be introduced. Such small gas quantities might be taken from or introduced to a pressure exchanger heat rejection stage ducting as shown in any one of the Figures 1 to 4 but they can still be considered substantially closed.

Features of the described embodiments can be usefully combined in various ways, according to the specific purpose of the pressure exchanger and its operating conditions. These various modifications to the cycle can be introduced without affecting the scope of the present invention.

What I claim is:

1. A pressure exchanger comprising in combination a first and a second element mounted co-axially for relative rotation; said first element defining a series of open-ended cells extending therethrough, said second element including first inlet means communicating with said cells for the introduction thereto of low pressure gas, second inlet means circumferentially displaced from said first inlet means and communicating with said cells for the introduction thereto of high pressure gas, said low pressure gas being compressed and said high pressure gas being expanded simultaneously in said cells during said relative rotation of said elements, outlet means communicating with said cells for the removal therefrom of said expanded gas and further inlet means communicating with said cells for the introduction thereto of cool low pressure gas for scavenging said cells; an interconnection between said outlet means and said further inlet means, cooling-means in said interconnection for gas flowing therethrough and means to effect said relative rotation.

2. A pressure exchanger comprising in combination a first and second element mounted co-axially for relative rotation; said first element defining a series of open-ended cells extending therethrough, said second element including first inlet means communicating with said cells for the introduction thereto of low pressure gas, second inlet means circumferentially displaced from said first inlet means and communicating with said cells for the introduction thereto of high pressure gas, said low pressure gas being compressed and said high pressure gas being expanded simultaneously in said cells during said relative rotation of said elements, outlet means communicating with said cells for the removal therefrom of said expanded gas and further inlet means communicating with said cells for the introduction thereto of cool low pressure gas for scavenging said cells; an interconnection between said outlet means and said further inlet means, a pipe communicating with said interconnection for the introduction thereto of gas from outside said pressure exchanger, cooling means in said interconnection for gas flowing within said interconnection and means to effect said relative rotation.

3. A pressure exchanger comprising in combination a first and a second element mounted co-axially for relative rotation; said first element defining a series of open-ended cells extending therethrough, said second element including first inlet means communicating with said cells for the introduction thereto of low pressure gas, second inlet means circumferentially displaced from said first inlet means and communicating with said cells for the introduction thereto of high pressure gas, said low pressure gas being compressed and said high pressure gas being expanded simultaneously in said cells during said relative rotation of said elements, outlet means communicating with said cells for the removal therefrom of said expanded gas and further inlet means communicating with said cells for the introduction thereto of cool low pressure gas for scavenging said cells, said outlet means and said further inlet means being positioned so that each of said cells communicates therewith shortly before communicating with said first inlet means; an interconnection between said outlet means and said further inlet means; cooling means for gas flowing in said interconnection and means to effect said relative rotation.

4. A pressure exchanger as claimed in claim 3 comprising a second outlet means communicating with cells at the ends thereof remote from said first inlet means.

5. A pressure exchanger comprising in combination a first and a second element mounted co-axially for relative rotation; said first element defining a series of open-ended cells extending therethrough, said second element including first inlet means communicating with said cells for the introduction thereto of low pressure gas, second inlet means circumferentially displaced from said first inlet means and communicating with said cells for the introduction thereto of high pressure gas, said low pressure gas being compressed and said high pressure gas being expanded simultaneously in said cells during said relative rotation of said elements, outlet means communicating with said cells for the removal therefrom of said expanded gas and further inlet means communicating with said cells for the introduction thereto of cool low pressure gas for scavenging said cells; an interconnection between said outlet means and said further inlet means; a heat exchanger matrix positioned in said interconnection in the path of gas flowing therethrough; means for passing a coolant through said matrix and means to effect said relative rotation.

6. A pressure exchanger comprising in combination a first and a second element mounted co-axially for relative rotation; said first element defining a series of open-ended cells extending therethrough, said second element including first inlet means communicating with said cells for the introduction thereto of low pressure gas, second inlet means circumferentially displaced from said first inlet means and communicating with said cells for the introduction thereto of high pressure gas, said low pressure gas being compressed and said high pressure gas being expanded simultaneously in said cells during said relative rotation of said elements, outlet means communicating with said cells for the removal therefrom of said expanded gas, further inlet means communicating with said cells for the introduction thereto of cool low pressure gas for scavenging said cells; and gas extraction means communicating with said cells to provide a supply of hot gas, an interconnection between said outlet means and said further inlet means, a device using said supply of hot gas, a flow connection between said device and said first inlet means through which at least part of the exhausted gas from said device is re-introduced into the pressure exchanger and means to effect said relative rotation.

7. Pressure exchanger apparatus according to claim 6, in which first and second flow connections extend from intermediate and lower pressure positions on said device to said pressure exchanger.

References Cited in the file of this patent

UNITED STATES PATENTS

| | | |
|---|---|---|
| 2,045,152 | Lebre | June 23, 1946 |
| 2,399,394 | Seippel | Apr. 30, 1946 |
| 2,461,186 | Seippel | Feb. 8, 1949 |
| 2,697,593 | Rydberg | Dec. 21, 1954 |
| 2,738,123 | Hussmann | Mar. 13, 1956 |

FOREIGN PATENTS

| | | |
|---|---|---|
| 1,020,890 | France | Nov. 26, 1952 |